(12) United States Patent  (10) Patent No.: US 9,223,649 B2
Bisen  (45) Date of Patent: Dec. 29, 2015

(54) SYSTEM AND METHOD OF SENDING CORRECTION DATA TO A BUFFER OF A NON-VOLATILE MEMORY

(75) Inventor: Omprakash Bisen, Bangalore (IN)

(73) Assignee: SANDISK TECHNOLOGIES INC., Plano, TX (US)

( * ) Notice: Subject to any disclaimer, the term of this patent is extended or adjusted under 35 U.S.C. 154(b) by 0 days.

(21) Appl. No.: 13/423,900

(22) Filed: Mar. 19, 2012

(65) Prior Publication Data

US 2013/0212448 A1  Aug. 15, 2013

(30) Foreign Application Priority Data

Feb. 15, 2012 (IN) .............................. 551/CHE/2012

(51) Int. Cl.
*G11C 29/00* (2006.01)
*G06F 11/10* (2006.01)

(52) U.S. Cl.
CPC .................................. *G06F 11/1048* (2013.01)

(58) Field of Classification Search
CPC ......... G06F 11/00; G06F 11/07; G06F 11/10;
G06F 11/1004; G06F 11/1008; G06F 11/1048;
G06F 11/1076; G06F 11/14; G06F 12/00;
G06F 12/02; G06F 12/16; G11B 20/1833;
G11C 29/00; H03M 13/00; H03M 13/05;
H05K 999/99
See application file for complete search history.

(56) References Cited

U.S. PATENT DOCUMENTS

| 7,296,128 | B2 * | 11/2007 | Lee ............................... 711/165 |
| 7,783,851 | B2 * | 8/2010 | Im et al. ........................ 711/165 |
| 8,359,517 | B2 * | 1/2013 | Pawlowski .................... 714/754 |
| 2002/0029316 | A1 * | 3/2002 | Williams et al. .............. 711/105 |
| 2009/0043951 | A1 | 2/2009 | Shalvi et al. |
| 2009/0125790 | A1 * | 5/2009 | Iyer et al. ...................... 714/773 |
| 2009/0193058 | A1 * | 7/2009 | Reid ............................. 707/200 |
| 2009/0307537 | A1 | 12/2009 | Chen et al. |
| 2010/0281342 | A1 * | 11/2010 | Chang et al. .................. 714/773 |
| 2011/0161784 | A1 | 6/2011 | Selinger et al. |
| 2011/0307762 | A1 * | 12/2011 | Tiziani et al. ................. 714/768 |
| 2013/0179751 | A1 * | 7/2013 | Linstadt ........................ 714/763 |

OTHER PUBLICATIONS

"512M x 8 Bit / 1G x 8 Bit NAND Flash Memory," K9W8G08U1M, K9K4G08U0M data sheet, Samsung Electronics, printed Mar. 7, 2012, 38 pages.
The International Search Report and Written Opinion of the International Searching Authority mailed Aug. 6, 2013 in International Application No. PCT/US2013/022901, 7 pages.
International Preliminary Report on Patentability for International Application No. PCT/US2013/022901, issued Aug. 19, 2014, 4 pages.

* cited by examiner

*Primary Examiner* — Albert Decady
*Assistant Examiner* — Enamul M Kabir
(74) *Attorney, Agent, or Firm* — Toler Law Group, PC

(57) ABSTRACT

A method and apparatus for receiving data from a buffer of a non-volatile memory is described. An error correction coding (ECC) operation is initiated at a controller to correct bit errors in the data. Correction data is sent from the controller to the buffer of the non-volatile memory to correct the bit errors in the data; the correction data may correspond to a portion of the data in the buffer.

20 Claims, 3 Drawing Sheets

US 9,223,649 B2

SYSTEM AND METHOD OF SENDING CORRECTION DATA TO A BUFFER OF A NON-VOLATILE MEMORY

CLAIM OF PRIORITY

The present application claims priority from Indian Patent Application No. 551/CHE/2012 filed on Feb. 15, 2012, which is incorporated herein in its entirety.

FIELD OF THE DISCLOSURE

The present disclosure is generally related to correcting data at a non-volatile memory.

BACKGROUND

Non-volatile memory devices, such as universal serial bus (USB) flash memory devices or removable storage cards, have allowed for increased portability of data and software applications. Flash memory devices can enhance data storage density and cost efficiency by storing multiple bits in each flash memory cell.

During a memory scrubbing operation at a memory location of a non-volatile memory, data is typically copied and moved to a different memory location. Before the data is moved, errors that may have accumulated in the data may be corrected by sending the data to an error correction coding (ECC) engine at a controller of the memory device. After the data is corrected, the data may be sent back to the non-volatile memory and stored to a different memory location at the non-volatile memory. Read or write performance of the memory device in response to a command to store user data to the non-volatile memory or to read user data from the non-volatile memory may be impacted by ongoing data transfer to and from the controller during a memory scrubbing operation.

SUMMARY

A data copying operation is performed by receiving, at a controller, data from a buffer of a non-volatile memory and performing an error correction coding (ECC) operation to correct bit errors in the data. Correction data is sent to the buffer to correct the bit errors in the data. The correction data includes a corrected bit and overwrites a portion of the data stored at the buffer that includes a corresponding uncorrected bit error.

A decrease in latency and power needed for the data copying operation may be achieved by sending the correction data to the buffer and overwriting a portion of the data stored at the buffer to correct bit errors in the data as compared to transferring all of the data back to the buffer.

DETAILED DESCRIPTION

Systems and methods of sending correction data to a buffer of a non-volatile memory are disclosed. Data is received from a buffer of the non-volatile memory and an error correction coding (ECC) operation is initiated to correct bit errors in the data. Correction data generated by the ECC operation is sent to the buffer to correct the bit errors in the data.

Figure 1:
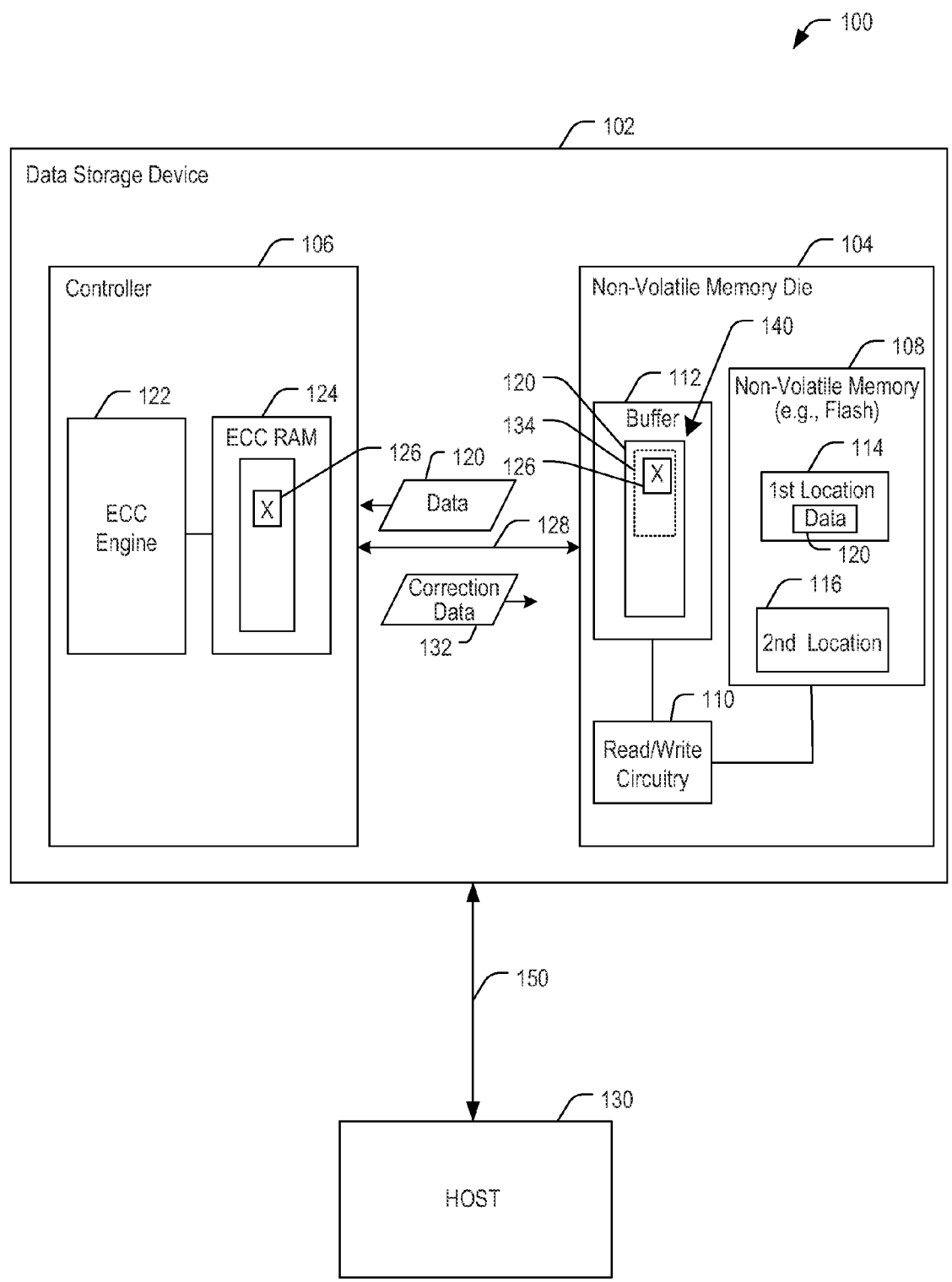
FIG. 1 is a block diagram of an illustrative embodiment of a system to send correction data to a buffer of a non-volatile memory.

Referring to FIG. 1, a particular illustrative embodiment of a system configured to send correction data to a buffer of a non-volatile memory is depicted and generally designated 100. The system 100 includes a data storage device 102 coupled to a host device 130 via a bus 150. The data storage device 102 includes a non-volatile memory die 104 coupled to a controller 106 via a second bus 128.

The host device 130 may be configured to provide data to be stored at a non-volatile memory 108 of the non-volatile memory die 104 or to request data to be read from the non-volatile memory 108. For example, the host device 130 may include a mobile telephone, a music or video player, a gaming console, an electronic book reader, a personal digital assistant (PDA), a computer such as a laptop computer, a notebook computer, or a tablet, an electronic device, or any combination thereof.

The data storage device 102 may be a memory card, such as a Secure Digital SD® card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). As another example, the data storage device 102 may be embedded memory in the host device 130, such as eMMC® (trademark of JEDEC Solid State Technology Association, Arlington, Va.) and eSD memory, as illustrative examples.

The non-volatile memory die 104 includes the non-volatile memory 108, read/write circuitry 110, and a buffer 112. The non-volatile memory 108 may be a non-volatile memory of a flash device, such as a NAND flash device, a NOR flash device, or any other type of flash device. The read/write circuitry 110 may be configured to read data 120 from a first location 114 of the non-volatile memory 108 and to write the data 120 to the buffer 112. The read/write circuitry 110 may be configured to write the data 120 from the buffer 112 to the non-volatile memory 108, such as to a second location 116.

The controller 106 may be configured to receive memory access requests from the host device 130 and to process data, such as the data 120, read from the non-volatile memory 108. The controller 106 includes an error correction coding (ECC) engine 122 and an ECC random access memory (RAM) 124.

The controller 106 may be configured to receive the data 120 from the buffer 112, initiate an ECC operation to correct bit errors in the data 120, and send correction data 132 to the buffer 112 to correct the bit errors in the data 120 stored at the buffer 112. For example, the controller 106 may be configured to cause the data 120 to be read from the first location 114 of the non-volatile memory 108 and written to and stored in the buffer 112. To illustrate, the controller 106 may be configured to cause the read/write circuitry 110 to read the data 120 from the first location 114 of the non-volatile memory 108 and to write the data 120 that was read from first location 114 to the buffer 112. The ECC RAM 124 may be configured to receive the data 120 from the buffer 112 via the second bus 128. The ECC engine 122 may be configured to perform an ECC operation to correct bit errors in the data 120.

For example, the data 120 may undergo a parity check "on-the-fly" while being sent from the buffer 112 to the ECC RAM 124. The ECC engine 122 may perform an ECC operation to identify bit errors and a bit error location 126 in the data 120. The ECC engine 122 may be configured to correct the bit errors in the data 120. The controller 106 may send the correction data 132 to the buffer 112 to correct the bit errors at the bit error location 126 in the data 120 stored at the buffer 112.

The correction data 132 may include at least one corrected bit and may overwrite a portion of the data 120 stored at the buffer 112. The portion may correspond to window replacement data 134 as described in further detail with respect to FIG. 2. Prior to receiving the correction data 132, the buffer 112 may include an uncorrected bit error that corresponds to the corrected bit error in the correction data 132, such that when the corrected bit error overwrites the uncorrected bit error, corrected data 140 is formed. A number of bits of the correction data 132 sent by the controller 106 via the second bus 128 may correspond to a size of the second bus 128. For example, if the size of the second bus 128 is 8-bits (i.e., 8-bits of data transferred per bus cycle), then the correction data 132 may be sent on a byte-by-byte basis. Other implementations, such as a 16-bit bus, a 32-bit bus, or any other size bus, may be used.

The controller 106 may be configured to cause the corrected data 140 to be programmed to the non-volatile memory 108. For example, the controller 106 may be configured to cause the read/write circuitry 110 to read the corrected data 140 from the buffer 112 and to write the corrected data 140 to the second location 116 of the non-volatile memory 108. The second location 116 may be different than the first location 114. In another implementation, the second location 116 may be the same as the first location 114.

During operation, the host device 130 may instruct the controller 106 to read the data 120 from the first location 114 of the non-volatile memory 108. The controller 106 may receive the data 120 from the buffer 112, initiate an ECC operation to correct bit errors in the data 120, and send the corrected data to the host device 130. The controller 106 may also send the correction data 132 to the buffer 112 to correct the bit errors in the data 120 stored at the buffer 112. The correction data 132 may overwrite a portion of the data 120 stored at the buffer 112. Alternatively or in addition, the data 120 may be read as part of a housekeeping operation, such as a memory scrubbing operation, rather than in response to a request from the host device 130.

By sending the correction data 132 to the buffer 112 to correct the bit errors in the data 120 stored at the buffer 112, a decrease in latency and power needed for a data copying operation may be achieved. For example, because all of the data 120 originally sent from the buffer 112 to the controller 106 for error correction does not need to be sent back to the buffer 112 after the ECC operation is performed, and instead only portions of the data 120 that include corrected bits are sent back to the buffer 112, latency may be decreased and power may be reduced.

Figure 2:
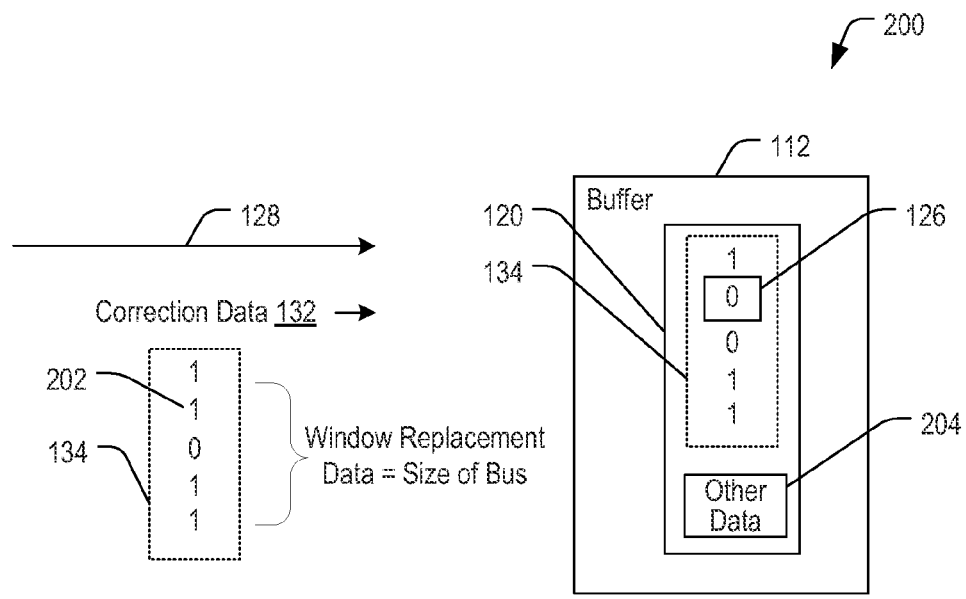
FIG. 2 is a diagram illustrating additional detail of the buffer of the system of FIG. 1.

Referring to FIG. 2, a particular illustrative embodiment of the system of FIG. 1 showing additional detail of the buffer 112 is depicted and generally designated 200. The system 200 of FIG. 2 illustrates a detailed view of the buffer 112 and the correction data 132 of FIG. 1. The correction data 132 may be sent to the buffer 112 via the second bus 128 to correct bit errors in the data 120 stored at the buffer 112. For example, the correction data 132 may include at least one corrected bit error 202 that corresponds to an uncorrected bit error at the bit error location 126 (i.e., illustrated as having a value of "0") and may overwrite a portion of the data 120 stored at the buffer 112.

To illustrate, the data 120 stored at the buffer 112 may contain a bit error identified at the bit error location 126. The correction data 132 may include the at least one corrected bit 202 (i.e., illustrated as having a value of "1") that corresponds to the uncorrected bit error (i.e., illustrated as having a value of "0") at the bit error location 126. The correction data 132 may be included within the window replacement data 134. The window replacement data 134 may correspond to a size of the second bus 128. For example, a number of bits of the correction data 132 within the window replacement data 134 may correspond to a size of the second bus 128. In addition, the window replacement data 134 may have a size that is less than a size of the data 120 stored at the buffer 112. As such, the correction data 132 may overwrite a portion of the data 120 stored at the buffer 112 corresponding to the size of the window replacement data 134. To illustrate, a portion of the data 120 stored at the buffer 112 (i.e., illustrated as the data "1 0 0 1 1") may be overwritten by the window replacement data 134 (i.e., illustrated as the data "1 1 0 1 1"). Other data 204 stored at the buffer 112 that is not within the window replacement data 134 is not disturbed.

Alternatively or in addition, the correction data 132 may include two or more corrected bit errors. For example, two or more corrected bit errors may fit within the window replacement data 134. In that case, when the portion of the data 120 stored at the buffer 112 is overwritten by the window replacement data 134, the two or more corrected bit errors may correct two or more uncorrected bit errors in the buffer 112 that correspond to the two or more corrected bit errors in the correction data 132.

A decrease in latency and power needed for a data copying operation may be achieved by sending the correction data 132 to the buffer 112 and overwriting a portion of the data 120 stored at the buffer 112 to correct bit errors in the data 120, rather than sending the entire corrected contents of the ECC RAM 124 received from the ECC engine 122 back to the buffer 112.

For example, ECC data may typically contain 2292 (e.g., 14 (header)+2048 (data)+230 (ECC)) bytes. When the ECC data is corrected via the ECC operation and transferred back to non-volatile memory, 2292 bytes may be sent back. However, a decrease in latency and power needed for the data copying operation may be achieved by sending the correction data 132 to the buffer 112 and overwriting a portion of the data 120 stored at the buffer 112 to correct bit errors in the data as compared to transferring all of the 2292 ECC data bytes. For example, data may be read from the non-volatile memory 108, stored in the buffer 112 of the non-volatile memory 108, and sent to the ECC engine 122 of the data storage device 102. After the data 120 is corrected by the ECC operation, the correction data 132 may be sent to the buffer 112 and may overwrite a portion of the data 120 stored at the buffer 112 to correct the bit errors in the data 120 stored at the buffer 112. The data may thereafter be programmed to a different memory location at the non-volatile memory 108. The correction data may contain substantially fewer bytes than the 2292 ECC bytes described above, thereby decreasing latency and power consumed during the data copying operation.

For example, if an error threshold is 100 and the correction data is a single byte of correction data, theoretically only 100 bytes of correction data may need to be sent back to the non-volatile memory 108 after the ECC operation is performed. However, sending bytes of correction data will likely cause "overhead", such as sending of commands (CMD) and/or address (ADDR) information. Overhead for sending 1 byte of correction data may be 6 bytes (e.g., 1 byte CMD+5 bytes ADDR), thus effectively 700 bytes of correction data may be sent to the non-volatile memory to correct 100 bytes of data. Sending 700 bytes of correction data and overhead corresponds to approximately a 69% reduction in latency as compared to sending 2292 bytes of ECC data. A "young" memory typically experiences fewer errors than an "old" memory. As a result, fewer bytes of correction data may be sent per ECC word in a young memory as compared to an old memory, which may result in a greater reduction in latency than 69%. Sending fewer bytes of correction data will also result in a reduction in power.

Figure 3:
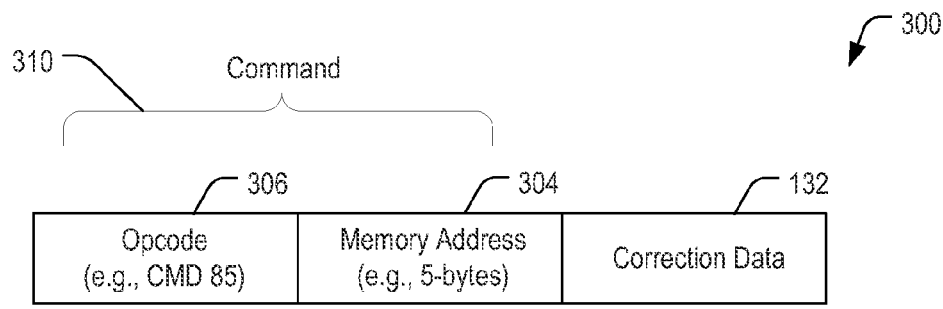
FIG. 3 illustrates a first representative command sequence that may be sent to a buffer of a non-volatile memory to correct bit errors in data stored at the buffer.

Data correction can be performed by sending "special" commands to overwrite a particular data byte in the buffer. For example, FIG. 3 illustrates a representative command sequence 300 that may be sent to a buffer, such as the buffer 112 of FIG. 2, to correct bit errors in the data 120 stored at the buffer 112. For example, sending the correction data 132 may include sending a command 310 to replace a portion of the data 120 stored at the buffer 112 with a corrected version of the portion of the data 120. The other data 204 stored at the buffer 112 that is not within the window replacement data 134 is not disturbed. The command sequence 300 may include the correction data 132, a memory address 304, and an opcode 306. The memory address 304 and the opcode 306 may form the command 310.

The opcode 306 may specify an operation to be performed. For example, the opcode 306 may correspond to an opcode of a random data input opcode, such as a CMD 85 opcode, that may enable correction of a single physical page of multiple multi-level-cell (MLC) pages in the buffer 112. In one implementation, the command sequence 300 may be a CMD 85-ADDR*5-DATA command sequence.

The correction data 132 may be a single byte of correction data. Therefore, 6 bytes of overhead data (e.g., 5 bytes for the memory address 304 and 1 byte for the opcode 306) are used to correct 1 byte of data. In contrast, replacing the entirety of the data 120 in the buffer may require the 2292 ECC bytes of data to correct 1 byte of data as explained above.

The memory address 304 may correspond to an address at the non-volatile memory 108 of FIG. 1 of the portion of the data 120 containing the bit errors. For example, the memory address 304 may correspond to an address that locates data within the first location 114 from which the data 120 is read. The memory address 304 may include a memory address of a portion of the data 120 stored at the buffer 112 to be replaced with a corrected version of the portion of the data. To illustrate, the non-volatile memory 108 may be a 137 gigabyte (GB) memory and the memory address 304 may include a 5-byte address to specify a particular byte in the 137 GB memory.

Figure 4:
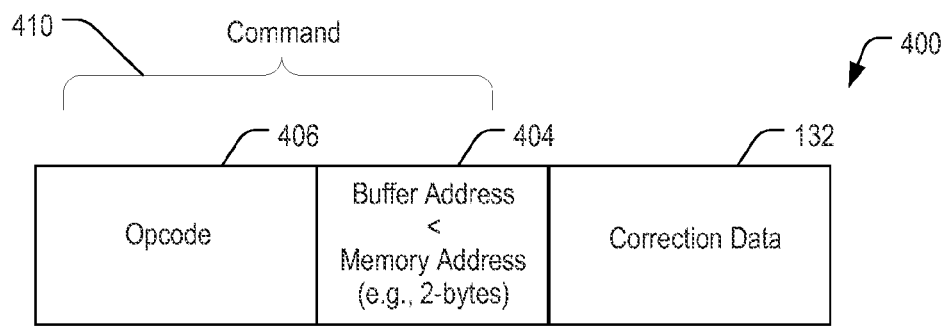
FIG. 4 illustrates a second representative command sequence that may be sent to a buffer of a non-volatile memory to correct bit errors in data stored at the buffer.

FIG. 4 illustrates a second representative command sequence 400 that may be sent to a buffer, such as the buffer 112 to correct bit errors in the data 120 stored at the buffer 112 with reduced overhead as compared to FIG. 3. For example, sending the correction data 132 may include sending a command 410 to replace a portion of the data 120 stored at the buffer 112 with a corrected version of the portion of the data 120. The other data 204 stored at the buffer 112 that is not within the window replacement data 134 is not disturbed. The command sequence 400 may include the correction data 132, a buffer address 404, and an opcode 406. The buffer address 404 and the opcode 406 may form the command 410.

The buffer address 404 may correspond to an address at the buffer 112 of FIG. 1 containing the bit errors (as compared to the memory address 304 of FIG. 3). For example, the buffer address 404 may correspond to a location in the buffer 112 of a portion of the data 120 stored at the buffer 112 to be replaced with a corrected version of the portion of the data. The buffer address 404 may have fewer bits than the memory address 304 of FIG. 3. For example, where a page size is 2 kilobytes (KB), the buffer address may be a 2-byte address to locate the portion of the data 120 within the buffer 112 to be replaced. Other implementations, such as a 3-byte address, a 4-byte address, or any other size address, may be used.

The opcode 406 may specify an operation to be performed. For example, the opcode 406 may be interpreted by logic at the non-volatile memory die 104 to replace a byte value in the buffer 112 with the correction data 132.

Figure 5:
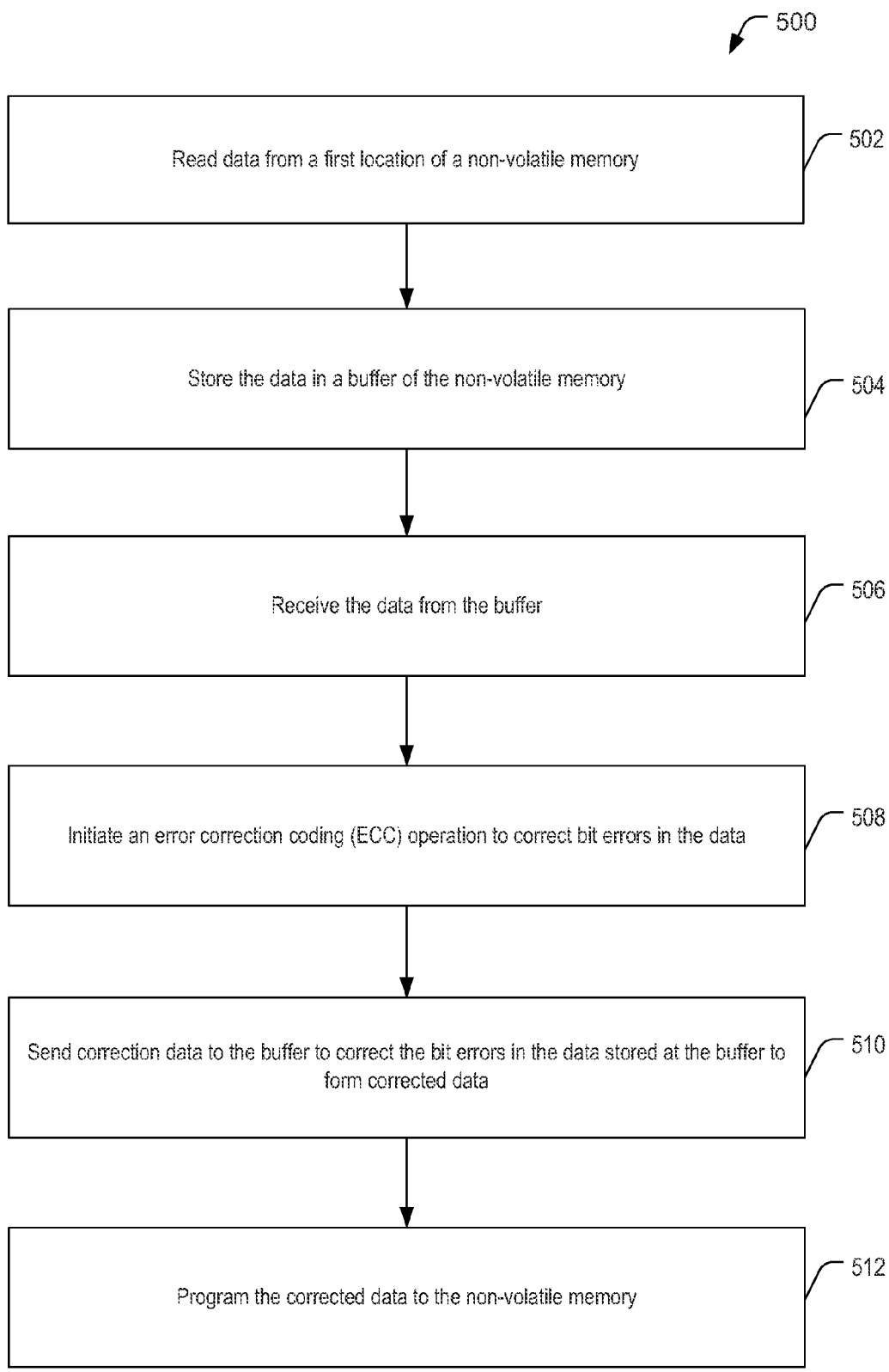
FIG. 5 is a flow diagram illustrating a particular embodiment of a method of sending correction data to a buffer of a non-volatile memory.

FIG. 5 depicts a flowchart that illustrates an embodiment of a method 500 of sending correction data to a buffer of a non-volatile memory. The method 500 may be performed by the data storage device of FIG. 1.

Data may be read from a first location of a non-volatile memory, at 502. For example, the read/write circuitry 110 may read the data 120 from the first location 114 of the non-volatile memory 108.

The data may be stored in a buffer, at 504. For example, the read/write circuitry 110 may write the data 120 that was read from first location 114 to the buffer 112.

The data may be received from the buffer, at 506. For example, the controller 106 may be configured to receive the data 120 from the buffer 112 via the second bus 128 and populate the ECC RAM 124 with the received data 120.

An error correction coding (ECC) operation to correct bit errors in the data may be initiated, at 508. For example, the controller 106 may initiate the ECC operation and the ECC engine 122 may perform the ECC operation to correct bit errors in the data 120 at the ECC RAM 124. After the ECC operation, the ECC RAM 124 may contain an error corrected version of the data 120.

Correction data may be sent to the buffer to correct the bit errors in the data stored at the buffer to form corrected data, at 510. For example, the ECC engine 122 may correct the bit errors in the data 120 and provide the correction data 132. The controller 106 may send the correction data 132 to the buffer 112 to correct the bit errors at the bit error location 126 in the data 120 stored at the buffer 112. The controller 106 may send the correction data 132 by sending a command, such as the command 310 of FIG. 3 or the command 410 of FIG. 4, to replace a portion (e.g., the window replacement data 134) of the data 120 stored at the buffer 112 with a corrected version of the portion of the data 120.

The corrected data may be programmed to the non-volatile memory, at 512. For example, the read/write circuitry 110 may read the corrected data 140 from the buffer 112 and write the corrected data 140 that was read from the buffer 112 to the non-volatile memory 108.

Because only a portion of the data 120 originally sent from the buffer 112 to the controller 106 for error correction needs to be sent back to the buffer 112 after the ECC operation is performed rather than all of the data 120, latency may be decreased and power may be reduced.

Although various components depicted herein are illustrated as block components and described in general terms, such components may include one or more microprocessors, state machines, or other circuits configured to enable a data storage device, such as the data storage device 102 of FIG. 1 to perform the particular functions attributed to such components, or any combination thereof. For example, the controller 106 of FIG. 1 may represent physical components, such as controllers, processors, state machines, logic circuits, or other structures to send correction data 132 to the buffer 112 to correct bit errors in data 120 stored at the buffer 112.

The controller 106 may be implemented using a microprocessor or microcontroller programmed to generate control information and to instruct operations. In a particular embodiment, the controller 106 includes a processor executing instructions that are stored at the non-volatile memory 108. Alternatively, or in addition, executable instructions that are executed by the processor may be stored at a separate memory location that is not part of the non-volatile memory 108, such as at a read-only memory (ROM).

In a particular embodiment, the data storage device 102 may be a portable device configured to be selectively coupled to one or more external devices. For example, the data storage device 102 may be a removable device such as a universal serial bus (USB) flash drive or a removable memory card. However, in other embodiments, the data storage device 102 may be attached or embedded within one or more host devices, such as within a housing of a portable communication device. For example, the data storage device 102 may be within a packaged apparatus, such as a wireless telephone, a personal digital assistant (PDA), a gaming device or console, a portable navigation device, a computer, or other device that uses internal non-volatile memory. In a particular embodiment, the data storage device 102 includes a non-volatile memory, such as a Flash memory (e.g., NAND, NOR, Multi-Level Cell (MLC), Divided bit-line NOR (DINOR), AND, high capacitive coupling ratio (HiCR), asymmetrical contactless transistor (ACT), or other Flash memories), an erasable programmable read-only memory (EPROM), an electrically-erasable programmable read-only memory (EEPROM), a read-only memory (ROM), a one-time programmable memory (OTP), or any other type of memory.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
at a data storage device including a controller coupled to a non-volatile memory via a bus, the controller including an error correction coding (ECC) engine and an ECC memory coupled to the ECC engine, performing:
receiving, at the controller, data from a buffer of the non-volatile memory via the bus and storing the received data in the ECC memory;
initiating, at the controller, an error correction coding (ECC) operation to cause the ECC engine to correct one or more bit errors in the received data that is stored at the ECC memory to generate, in the ECC memory, an error-corrected version of the received data, the error-corrected version including a first portion wherein the first portion is a size that is less than the size of the received data and includes the corrected one or more bit errors; and
sending, via the bus, only the first portion including the one or more corrected bit errors from the controller to the buffer, wherein the first portion is used to overwrite a portion but not all of the data in the buffer to correct the one or more bit errors in the data in the buffer.

2. The method of claim 1, wherein the first portion includes a plurality of corrected bits and overwrites the portion of the data in the buffer that includes a corresponding uncorrected bit errors to form corrected data.

3. The method of claim 2, further comprising programming the corrected data to the non-volatile memory.

4. The method of claim 3, further comprising, prior to receiving the data at the controller from the buffer:
reading the data from a first location of the non-volatile memory; and
storing the data in the buffer,
wherein the corrected data is programmed to a second location of the non-volatile memory that is different than the first location of the non-volatile memory.

5. The method of claim 1, wherein sending the first portion includes sending a command to replace a portion of the data in the buffer with a corrected version of the portion of the data.

6. The method of claim 5, wherein the command includes a memory address corresponding to a location within the non-volatile memory that stores the portion of the data.

7. The method of claim 6, wherein sending the command includes sending a CMD 85-ADDR*5-DATA command sequence.

8. The method of claim 5, wherein the command includes a buffer address corresponding to a location within the buffer that stores the portion of the data.

9. The method of claim 1, wherein the first portion has a number of bits that matches a data width of the bus.

10. The method of claim 1, wherein the non-volatile memory is a flash memory.

11. A data storage device comprising:
a non-volatile memory including a buffer; and
a controller coupled to the non-volatile memory via a bus, the controller including an error correction coding (ECC) engine and an ECC memory coupled to the ECC engine, the controller configured to:
receive data from the buffer via the bus and store the received data in the ECC memory;
initiate an error correction coding (ECC) operation to cause the ECC engine to correct one or more bit errors in the received data that is stored at the ECC memory to generate, in the ECC memory, an error-corrected version of the received data, the error-corrected version including a first portion wherein the first portion is a size that is less than the size of the received data and includes the corrected one or more bit errors; and
send, via the bus, only the first portion including the one or more corrected bit errors from the controller to the buffer, wherein the first portion is used to overwrite a portion but not all of the data in the buffer to correct the one or more bit errors in the data in the buffer.

12. The data storage device of claim 11, wherein the first portion includes a plurality of corrected bits and overwrites the portion of the data in the buffer that includes a corresponding uncorrected bit errors to form corrected data.

13. The data storage device of claim 12, wherein the controller is further configured to program the corrected data that is in the buffer into the non-volatile memory.

14. The data storage device of claim 13, wherein the controller is further configured to:
   cause the data to be read from a first location of the non-volatile memory;
   cause the data to be stored in the buffer; and
   cause the corrected data in the buffer to be stored at a second location of the non-volatile memory that is different than the first location of the non-volatile memory.

15. The data storage device of claim 11, wherein the ECC memory includes a random access memory coupled to the ECC engine.

16. The data storage device of claim 11, wherein the first portion has a number of bits that matches a data width of the bus.

17. The data storage device of claim 11, wherein the controller sends the first portion by sending a command to replace a portion of the data in the buffer with the first portion.

18. The data storage device of claim 17, wherein the command includes a memory address corresponding to a storage element within the non-volatile memory that stores the portion of the data.

19. The data storage device of claim 18, wherein sending the command includes sending a CMD 85-ADDR*5-DATA command sequence.

20. The data storage device of claim 17, wherein the command includes a buffer address of the portion of the data.

* * * * *